US008473272B1

(12) United States Patent
Donlin et al.

(10) Patent No.: US 8,473,272 B1
(45) Date of Patent: Jun. 25, 2013

(54) ANALYSIS OF THE OPERATION OF A RECONFIGURABLE SYSTEM

(75) Inventors: Adam P. Donlin, Los Gatos, CA (US); Paul R. Schumacher, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 820 days.

(21) Appl. No.: 12/684,527

(22) Filed: Jan. 8, 2010

(51) Int. Cl.
*G06F 17/50* (2006.01)
(52) U.S. Cl.
USPC .............................. 703/15; 716/109; 716/136
(58) Field of Classification Search
USPC ..................................... 703/15; 716/109, 136
See application file for complete search history.

(56) References Cited

U.S. PATENT DOCUMENTS 6,389,379 B1 * 5/2002 Lin et al. ......................... 703/14

OTHER PUBLICATIONS

Shi et al. "A system Level Resource Estimation Tool for FPGAs"., Field Programmable Logic and Application Lecture Notes in Computer Science vol. 3203, 2004., pp. 424-433.*
Bjurèus et al. "FPGA resource and timing Estimation from Matlab Execution Traces"., Proceeding CODES '02 Proceedings of the tenth international symposium on Hardware/software codesign. 2002., pp. 31-36.*
Milder et al. "Fast and Accurate Resource Estimation of Automatically Generated Custom DFT IP Cores"., 2006 ACM., p. 211-220.*
Schumacher et al. ."Fast and Accurate Resource Estimation of RTL-Based Designs Targeting FPGAS"., IEEE 2008. p. 59-64.*
U.S. Appl. No. 12/041,167, filed Mar. 3, 2008, Schumacher et al.
U.S. Appl. No. 12/041,182, filed Mar. 3, 2008, Schumacher et al.
Kulkarni, Dhananjay et al., "Compile-Time Area Estimation for LUT-Based FPGAs," *ACM Transactions on Design Automation of Electronic Systems*, Jan. 2006, pp. 104-122, vol. 11, Issue 1, ACM, New York, New York, USA.
Xu, Min et al., "ChipEst-FPGA: A Tool for Chip Level Area and Timing Estimation of Lookup Table Based FPGAs for High Level Applications," *Proc. of the 1997 Asia and South Pacific Design Automation Conference*, Jan. 28, 1997, pp. 435-440, IEEE, Piscataway, New Jersey, USA.

* cited by examiner

*Primary Examiner* — Eunhee Kim
(74) *Attorney, Agent, or Firm* — LeRoy D. Maunu (57) ABSTRACT

Approaches for preparing a system that is reconfigurable to implement a plurality of optional hardware functions are disclosed. In one approach, a method includes simulating the operation of the system during a time interval. The system is reconfigurable to implement a subset of the optional hardware functions, and the simulating determines which of the optional hardware functions are active and which of the optional hardware functions are inactive during a plurality of subintervals of the time interval. Respective circuit resource sets are estimated for the subintervals of the time interval. For each of the subintervals, the respective circuit resource set implements the system including the optional hardware functions that are active during the subinterval. Information describing the respective circuit resource sets for the subintervals is stored for preparing partial reconfigurations of the system.

18 Claims, 4 Drawing Sheets

ANALYSIS OF THE OPERATION OF A RECONFIGURABLE SYSTEM

FIELD OF THE INVENTION

The present invention generally relates to reconfigurable systems, and more particularly to analysis and design of reconfigurable systems.

BACKGROUND

A reconfigurable system is reconfigurable to operate in several operating modes. For example, an embedded system has a half-duplex serial communication that is in either a transmitting mode or a receiving mode. The embedded system can be reconfigured to implement either a transmitter or a receiver for the half-duplex serial communication depending on the communication mode.

While implementing a reconfigurable system for identified operating modes is straightforward, identifying operating modes in a particular system is time consuming and difficult. Furthermore, because the reconfiguration infrastructure fundamentally impacts the structure of an implementation of an embedded system, the operating modes should be identified early in the development of the reconfigurable system.

The present invention may address one or more of the above issues.

SUMMARY

The embodiments of the invention provide various approaches for preparing and analyzing a reconfigurable system. In one embodiment, a method for preparing a system that is reconfigurable to implement a plurality of optional hardware functions comprises simulating the operation of the system during a time interval. The system is reconfigurable to implement a subset of the optional hardware functions, and the simulating includes determining which of the optional hardware functions are active and which of the optional hardware functions are inactive during a plurality of subintervals of the time interval. The method estimates respective circuit resource sets for the subintervals of the time interval. For each of the subintervals, the respective circuit resource set implements the system including the optional hardware functions that are active during the subinterval. The method stores information describing the respective circuit resource sets for the subintervals.

In another embodiment, a processor-implemented method is provided for analyzing an operation of a system that is reconfigurable to implement a plurality of optional hardware functions. The method comprises simulating on a processor the operation of the system during a time interval. The system is reconfigurable to implement a subset of the optional hardware functions, and the simulating includes determining which of the optional hardware functions are active and which of the optional hardware functions are inactive during each of a plurality of subintervals of the time interval. The method estimates respective circuit resource sets for the subintervals of the time interval. For each of the subintervals the respective circuit resource set is sufficient to implement the system including the optional hardware functions that are active during the subinterval but not implement the optional hardware functions that are inactive during the subinterval. The method stores information describing the respective circuit resource sets for the subintervals.

A program storage medium is provided in another embodiment. The program storage medium includes a processor-readable storage device storing instructions for analyzing an operation of a system that is reconfigurable to implement a plurality of optional hardware functions. Execution of the instructions by one or more processors causes the one or more processors to perform operations including simulating the operation of the system during a time interval. The system is reconfigurable to implement a subset of the optional hardware functions, and the simulating includes determining which of the optional hardware functions that are active and which of the optional hardware functions are inactive during a plurality of subintervals of the time interval. The operations further include estimating respective circuit resource sets for the subintervals of the time interval. For each of the subintervals the respective circuit resource set implements the system including the optional hardware functions that are active during the subinterval. The operations include storing information describing the respective circuit resource sets for the subintervals.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
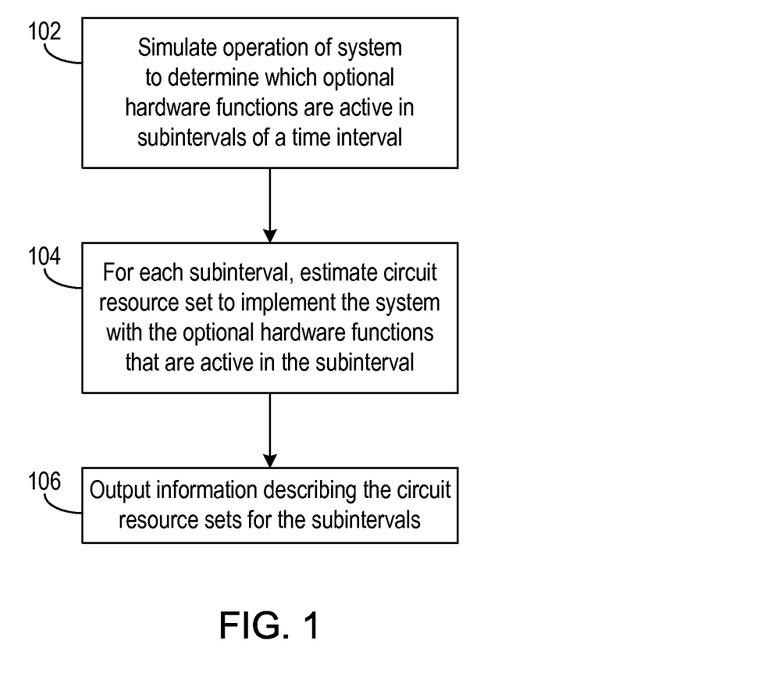
FIG. 1 is a flow diagram of a process for analyzing the operation of a reconfigurable system in accordance with various embodiments of the invention.

FIG. 1 is a flow diagram of a process for analyzing the operation of a reconfigurable system in accordance with various embodiments of the invention. The system is reconfigurable to implement functions currently active, and this capability reduces the resources needed to implement the system.

At step 102, a simulator simulates the operation of a system over a time interval. The system includes optional hardware functions and the system can intermittently activate certain of the optional hardware functions. The simulation determines optional hardware functions that are active during subintervals of the time interval.

At step 104, the set of circuit resources needed to implement the system is estimated for each subinterval. The resources needed to implement the system in each subinterval are the resources needed to implement the system including the optional hardware functions that are active during the subinterval.

At step 106, information is output describing the circuit resources needed for implementing the system in each subinterval. In various embodiments, the information is displayed to a user and the user selects the optional hardware resources to be implemented during the subintervals. For example, if the displayed information shows the system has two optional hardware functions that are active in non-overlapping subintervals, the user can specify a system that is reconfigurable between two implementations that respectively implement these two optional hardware functions. Thus, the system implements only one of these two optional hardware functions at a time, and this reduces the circuit resources needed to implement the system.

Figure 2:
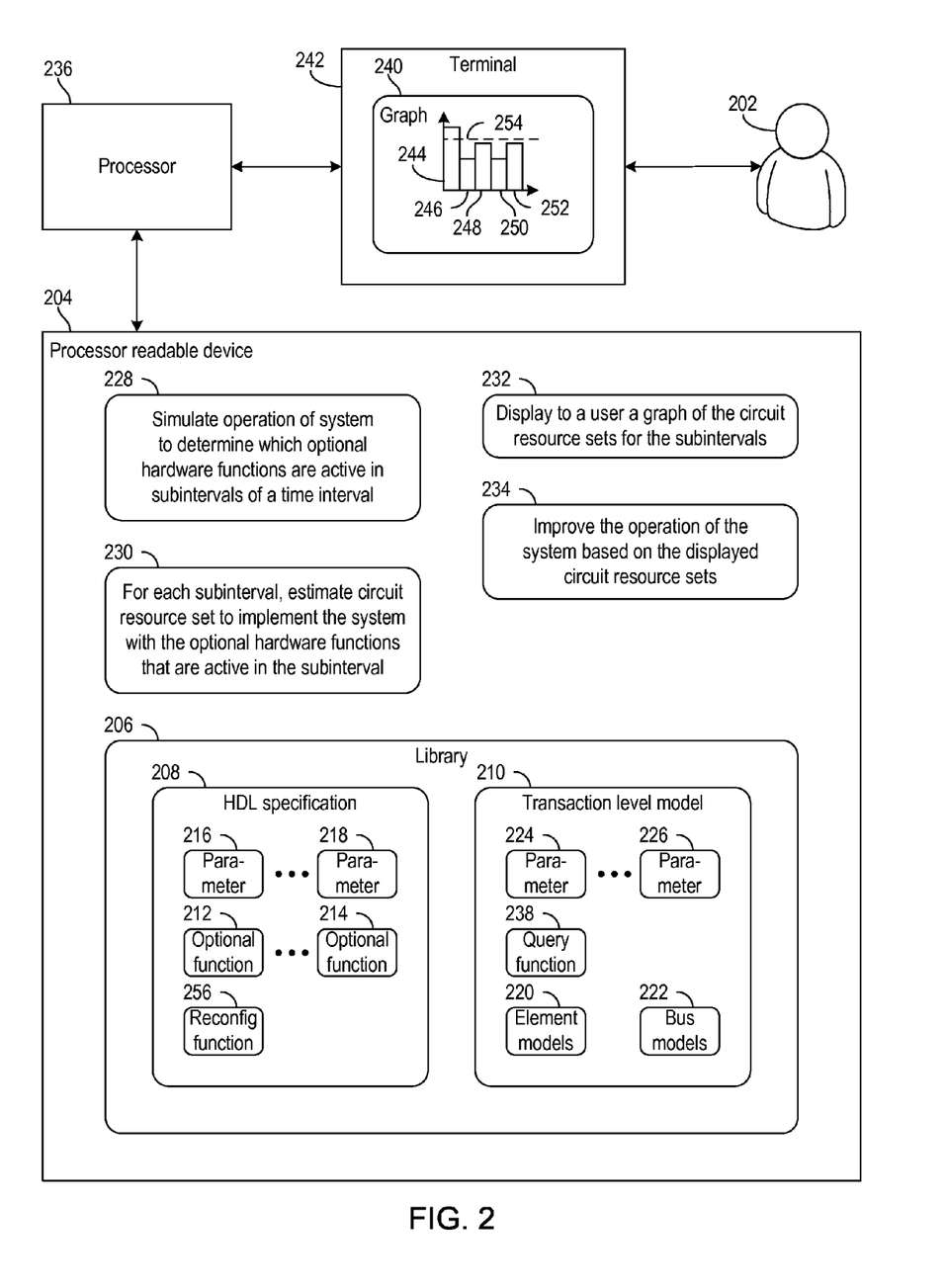
FIG. 2 is a block diagram of a system for designing the operation of a reconfigurable system in accordance with various embodiments of the invention.

FIG. 2 is a block diagram of a system for designing the operation of a reconfigurable system in accordance with various embodiments of the invention. A user 202 interacts with the system to design the reconfigurable system.

Processor-readable device 204 stores a library 206 including an HDL specification 208 of the reconfigurable system and a transaction level model 210 of the reconfigurable system. In one embodiment, library 206 also includes various components that are configurable with optional functions 212 through 214, and the HDL specification 208 has custom logic that interconnects these components and defines parameters 216 through 218 to select which optional functions 212 through 214 are included in these components. In this embodiment or in another embodiment, custom logic in HDL specification 208 provides some or all of optional functions 212 through 214, and user 202 specifies the values of parameters 216 through 218 to select whether to include these optional functions in a hardware implementation synthesized from HDL specification 208.

In one embodiment, transaction level model 210 for the reconfigurable system is the transaction level models 220 and 222 interconnected by custom logic from HDL specification 208. In another embodiment, transaction level model 210 is a high-level model and HDL specification 208 is generated from this transaction level model 210. Transaction level model 210 includes parameters 224 through 226 corresponding to parameters 216 through 218 of the HDL specification 208. Parameters 224 through 226 enable and disable various optional functions of the element models 220, the bus models 222, and/or various optional functions of custom logic of the transaction level model 210. Thus, the values given parameters 224 through 226 configure transaction level model 210 to model the behavior of HDL specification 208 for specified values of parameters 216 through 218.

Processor-readable device 204 is configured with software modules 228, 230, 232, and 234 for analyzing the operation of a system that is reconfigurable to implement various optional hardware functions.

Execution of the instructions in software module 228 causes processor 236 to simulate the operation of the reconfigurable system by executing transaction level model 210. In one embodiment, the element models 220 exchange transactions via the bus models 222 during the simulation. In one example, the element models 220 include a processor model and a memory model for corresponding components of the HDL specification 208, and the simulation of the operation of the reconfigurable system includes simulation of the processor model executing software stored in the memory model.

In one embodiment, transaction level model 210 includes a query function 238 for querying the values of parameters 224 through 226. Before executing an optional function in element model 220 or bus model 222, the transaction level model 210 executes the query function 238 to check whether the optional function is enabled by the values given to parameters 224 through 226. Thus, during the simulation of the operation of the reconfigurable system, the queries to the query function 238 determine the optional functions that are currently active. During the simulation of the operation of the reconfigurable system over a time interval, the active optional functions are determined during each subinterval of the time interval.

In another embodiment, each optional function is marked active for each subinterval in which the simulation exercises the optional function. Thus, the active optional functions in a particular subinterval are the optional functions marked as active during that particular subinterval.

Execution of the instructions in software module 230 causes processor 236 to estimate a circuit resource set for each subinterval of the time interval. The circuit resource set for a subinterval is the circuit resources needed to implement the reconfigurable system including the optional functions that are active during the subinterval. Thus, the resource sets for the subintervals will vary as optional functions become active and inactive during the simulation.

Execution of the instructions in software module 232 causes processor 236 to output information describing the circuit resource sets for the subintervals. In one embodiment, the information is a graph 240 displayed to user 202 on terminal 242. The example graph 240 shows a circuit resource set 244, 246, 248, 250, or 252 for implementing the reconfigurable system in each of five subintervals of the simulation of the behavior of the reconfigurable system.

The example graph 240 includes a limit 254 that indicates a proportion of the programmable integrated circuit that is reconfigurable during each subinterval. For example, the duration of the subinterval and the reconfiguration rate of the programmable integrated circuit determine the proportion of the programmable integrated circuit that is reconfigurable during the subinterval. The limit helps indicate whether the system can be reconfigured without halting the operation of the system during reconfiguration. For example, if one optional hardware function 212 becomes inactive in subinterval 244 and another optional hardware function 214 becomes active in subinterval 248, then the reconfigurable system is uninterruptedly reconfigurable during subinterval 246 to replace the deactivated function 212 with the activated function 214 when the circuit resources for the activated function 214 are less than the limit 254 for subinterval 246. It will be appreciated that the limit 254 varies in certain embodiments, such as an embodiment with subintervals of varying duration. The limit 254 may also be influenced by the particular target FPGA chosen for implementation. The target FPGA affects the limit, because different families of FPGAs have different reconfiguration properties.

In certain embodiments, execution of the instructions in software module 234 causes processor 236 to improve the operation of the reconfigurable system based on the circuit resource sets 244, 246, 248, 250, and 252 displayed in graph 240 to user 202. In one example, the user 202 specifies a reconfiguration function 256 by selecting an optional hardware function 212 which has been determined to become inactive in subinterval 244 and selecting an optional hardware function 214 which has been determined to become active in subinterval 248. The reconfigurable system is improved to include the reconfiguration function 256 that replaces the deactivated function 212 with the activated function 214 during subinterval 246. The reconfigurable system is improved because circuit resources are reused to implement both functions 212 and 214 during different time intervals 244 and 248. In one example, this reduces the circuit resources needed during the overall operation of the reconfigurable system and consequently a smaller programmable integrated circuit can implement the reconfigurable system. Because programmable circuit resources are often needed to implement reconfiguration function 256, the reused circuit resources should be sufficient to overcome the overhead of the reconfiguration function 256. In some embodiments the overhead of reconfiguration function 256 may influence the calculation of limit 254.

The processor-readable device 204, processor 236, and terminal 242 comprise an example computing arrangement on which the processes described herein may be implemented. Those skilled in the art will appreciate that various alternative computing arrangements including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

The architecture of the computing arrangement depends on implementation requirements as would be recognized by those skilled in the art. The processor 236 may be one or more general purpose processors, or a combination of one or more general purpose processors and suitable co-processors, or one or more specialized processors (e.g., RISC, pipelined, etc.).

The processor-readable device may be a memory/storage arrangement implemented as hierarchical storage which is commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, with remote storage being coupled to the processor arrangement via a local area network, for example.

Figure 3:
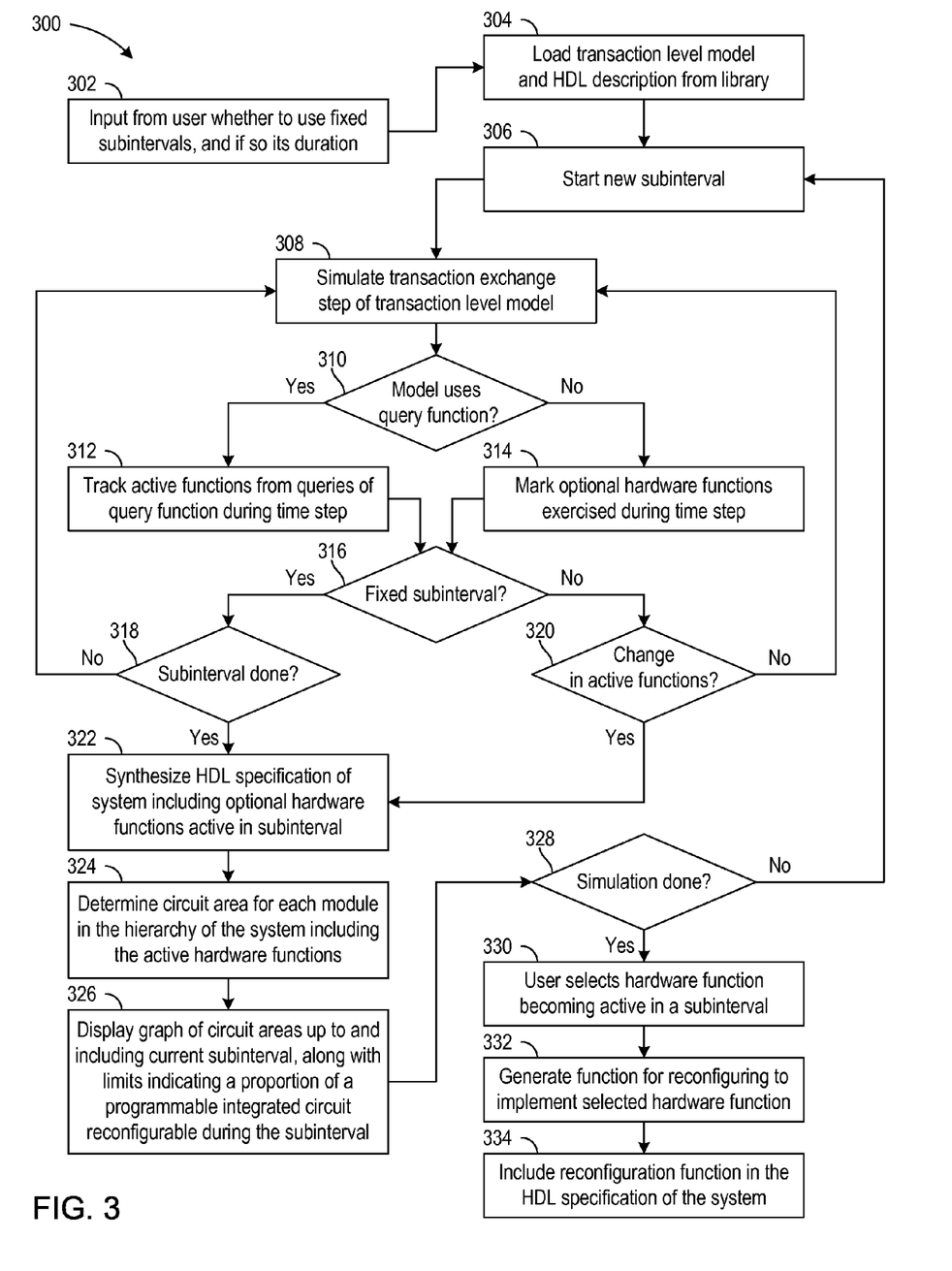
FIG. 3 is a flow diagram of a process for designing the operation of a reconfigurable system in accordance with various embodiments of the invention.

FIG. 3 is a flow diagram of a process 300 for designing the operation of a reconfigurable system in accordance with various embodiments of the invention. The operation of the system is analyzed to display information indicating whether a reconfigurable implementation of the system would use fewer programmable circuit resources than an implementation of the system that is not reconfigurable. Based on this displayed information, a user selects an optional function to be implemented in the system hardware during reconfiguration.

At step 302, a user specifies whether to use variable subintervals or fixed subintervals of a user-specified duration. At step 304, the transaction level model of a system and the HDL specification of the system are loaded from a library. At step 306, simulation of the operation of the system begins by starting a new subinterval. At step 308, the transaction level model simulates the time step for exchanging a transaction between components of the system. A transaction includes, for example, a read request, a write request with data, or a read return for a read request.

Decision 310 checks whether the transaction level model includes a query function. If the transaction level model includes a query function, then process 300 proceeds to step 312; otherwise, process 300 proceeds to step 314. At step 312, the optional hardware functions that are active are tracked from the queries of the query function during the time step for the transaction exchange. At step 314, the optional hardware functions that are active during the current subinterval are marked to include optional hardware functions that are exercised during the transaction time step.

Decision 316 checks whether the user specified subintervals of fixed duration at step 302. For subintervals of fixed duration, process 300 proceeds to decision 318, and for variable subintervals, process 300 proceeds to decision 320. Decision 318 checks whether the current fixed subinterval is complete. If the current fixed subinterval is complete, process 300 proceeds to step 322; otherwise, process 300 returns to step 308 to simulate the next transaction exchange. Decision 320 checks whether the currently active functions have changed during the transaction time step. If the active hardware functions have changed, process 300 proceeds to step 322 to begin a new subinterval; otherwise, process 300 returns to step 308 to simulate the next transaction exchange. Thus, each subinterval spans a specific set of activated optional functions.

At step 322, the HDL specification is synthesized for the system that includes the optional hardware functions that were active during the subinterval. At step 324, the circuit area is determined from the synthesized system for each module in the system hierarchy that includes the active hardware functions. In another embodiment, circuit area is estimated from the results of a partial synthesis that does not include placement and routing. At step 326, a graph of the circuit areas calculated at step 324 is dynamically displayed for the current and prior subintervals. In one embodiment, for each subinterval the graph displays a vertical bar subdivided into a rectangle for each module in the hierarchy that includes an optional hardware function, and the size of the rectangle for each module is the estimated circuit area for the instances of the module including the optional hardware functions that are active in each subinterval. It will be appreciated that a particular system can include optional hardware functions that never become active because of user-specified parameters, and these persistently inactive optional hardware functions are effectively ignored during process 300.

In one embodiment, the graph also displays limits for various programmable integrated circuits, with each limit indicating a proportion of a programmable integrated circuit that is reconfigurable during each subinterval. These limits help the user determine whether the programmable integrated circuit is reconfigurable to implement a particular optional hardware function within a subinterval or several subintervals.

Decision 328 checks whether the time interval of simulation is complete. If simulation is incomplete, process 300 returns to step 306 to start the next fixed or variable subinterval. After simulation completes, process 300 proceeds to step 330. It will be appreciated that a user can specify the duration of the time interval by interrupting simulation after discovering a candidate reconfiguration in the dynamically displayed graph.

At step 330, a user selects an optional hardware function becoming active in a subinterval. In one embodiment, a user also selects an optional hardware function becoming inactive in some preceding subinterval. At step 322, a reconfiguration function is generated that reconfigures the system to implement the activated hardware function. In one embodiment, the reconfiguration function replaces an inactivated hardware function with the activated hardware function. At step 334, the HDL specification loaded at step 304 is modified to include the reconfiguration function. In one embodiment, the modified HDL specification is synthesized to produce a hardware implementation of the system that reconfigures itself to implement the optional hardware function selected at step 330 during operation of the system.

Figure 4:
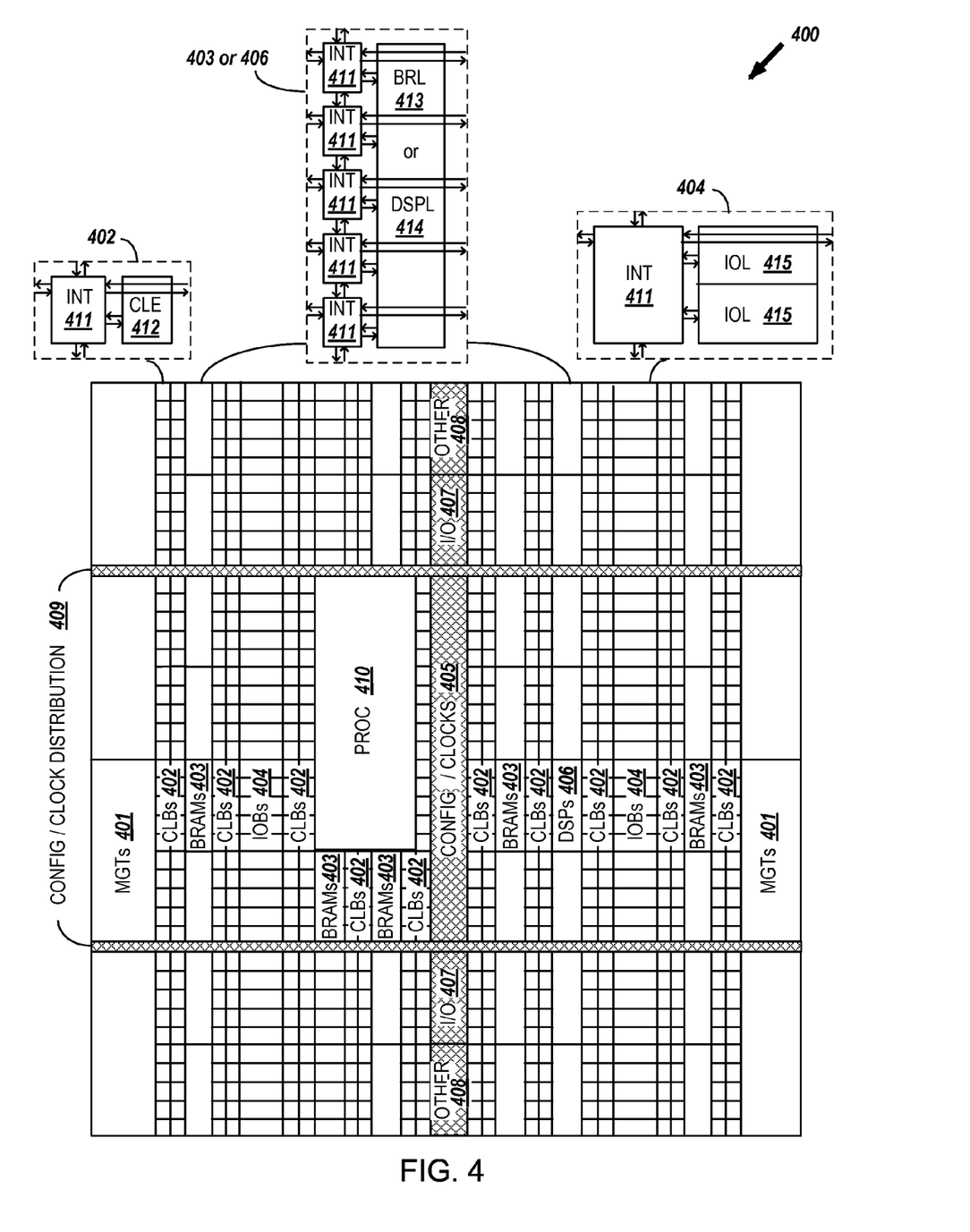
FIG. 4 is a block diagram of a programmable integrated circuit that reconfigures itself in accordance with various embodiments of the invention.

FIG. 4 is a block diagram of a programmable integrated circuit that reconfigures itself in accordance with various embodiments of the invention. Programmable integrated circuits can include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA. Because the configuration logic is accessible from the tiles of programmable logic and interconnect resources, the FPGA is configurable to implement a reconfiguration function that reconfigures the FPGA in accordance with various embodiments of the invention.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for preparing a system that is reconfigurable to implement a plurality of optional hardware functions, comprising:
   simulating operation of the system during a time interval by executing a model of the system;
   wherein the system is reconfigurable to implement a subset of the optional hardware functions;
   wherein the model includes a query function and a plurality of parameters for including and excluding the optional hardware functions in the execution of the model of the system, and the query function queries the plurality of parameters;
   wherein the simulating includes determining which of the optional hardware functions are active and which of the optional hardware functions are inactive during a plurality of subintervals of the time interval by tracking queries of the parameters by the query function during the subintervals;
   wherein the execution of the model includes and excludes the optional hardware functions in response to the queries of the parameters during the subintervals;
   estimating respective circuit resource sets for the subintervals of the time interval;
   wherein for each of the subintervals the respective circuit resource set implements the system including the optional hardware functions that are active during the subinterval; and
   storing information describing the respective circuit resource sets for the subintervals.

2. The method of claim 1, further comprising:
   selecting one of the hardware functions determined to be inactive in a first one of the subintervals and determined to be active in a successive second one of the subintervals; and
   generating a reconfiguration function for reconfiguring a plurality of programmable logic and interconnect resource sets of a programmable integrated circuit from implementing a first implementation to implementing a second implementation,
   wherein the first implementation implements the system including the optional hardware functions active during the first subinterval and not including the selected one of the hardware functions, and
   wherein the second implementation implements the system including the optional hardware functions active during the successive second subinterval and including the selected one of the hardware functions.

3. The method of claim 2, further comprising:
   configuring the programmable logic and interconnect resource sets of the programmable integrated circuit to implement the first implementation and the reconfiguration function during the first subinterval,
   wherein the reconfiguration function reconfigures the programmable logic and interconnect resource sets to implement the second implementation during the successive second subinterval.

4. The method of claim 3, wherein the reconfiguration function that reconfigures the programmable logic and interconnect resource sets to implement the second implementation during the successive second subinterval reduces an amount of the programmable logic and interconnect resource sets needed to implement both the first implementation during the first subinterval and the second implementation during the successive second subinterval.

5. The method of claim 1, further comprising displaying a graph of the information describing the respective circuit resource sets for the subintervals.

6. A processor-implemented method for analyzing an operation of a system reconfigurable to implement a plurality of optional hardware functions, the method comprising:
   simulating by a processor the operation of the system during a time interval by executing a model of the system;
   wherein the system is reconfigurable to implement a subset of the optional hardware functions, and the model has a plurality of parameters for including and excluding the optional hardware functions in the execution of the model of the system;
   wherein the model includes a function for querying the plurality of parameters, and executing the model includes and excludes the optional hardware functions in response to a plurality of queries of the parameters via the function;
   wherein the simulating includes determining which of the optional hardware functions are active and which of the optional hardware functions are inactive during each of a plurality of subintervals of the time interval by tracking the queries of the parameters during the subinterval;
   estimating respective circuit resource sets for the subintervals of the time interval;
   wherein for each of the subintervals the respective circuit resource set is sufficient to implement the system including the optional hardware functions that are active during the subinterval but not implement the optional hardware functions that are inactive during the subinterval; and
   storing information describing the respective circuit resource sets for the subintervals.

7. The processor-implemented method of claim 6, wherein the determining of the optional hardware functions that are active during each of the subintervals includes marking each optional hardware function as active in the subinterval in response to the execution of the model exercising the optional hardware function during the simulating in the subinterval.

8. The processor-implemented method of claim 6, wherein:
   the simulating includes loading the model of the system from a library also including a specification of the system in a hardware description language,
   the specification has a plurality of additional parameters corresponding to the parameters of the model, and
   the specification of the system includes and excludes the optional hardware functions in response to the additional parameters.

9. The processor-implemented method of claim 6, wherein the simulating of the operation of the system during the time interval includes ending one of the subintervals and starting a next one of subintervals in response to each change in the optional hardware functions that are active during the time interval.

10. The processor-implemented method of claim 6, further comprising:
    storing a duration value indicative of a duration in response to user input,
    wherein the simulating of the operation of the system during the time interval includes simulating the operation of the system during the subintervals that each have the duration.

11. The processor-implemented method of claim 6, wherein:
    the transaction level model includes a plurality of element models and a plurality of bus models, and
    the execution of the transaction level model includes exchanging transactions between the element models and the bus models.

12. The processor-implemented method of claim 11, wherein:
    the transaction level model includes a processor element model and a memory element model, and
    the execution of the transaction level model includes the processor element model executing software stored in the memory element model.

13. The processor-implemented method of claim 6, wherein the estimating of the respective circuit resource set for each subinterval includes synthesizing an implementation of the system including the optional hardware functions that are active during the subinterval.

14. The processor-implemented method of claim 13, wherein:
    the system includes a hierarchy of modules, and
    the respective circuit resource set for each subinterval is a circuitry area within each of the modules in the implementation of the system for the subinterval.

15. The processor-implemented method of claim 6, wherein the outputting of the information includes dynamically updating a graph upon completing the simulating of the operation of the system for each subinterval, and dynamically displaying to a user the graph of the respective circuit resource sets versus the subintervals prior to and including the subinterval.

16. The processor-implemented method of claim 15, wherein:
    the estimating of the respective circuit resource set for each subinterval includes dynamically estimating the respective circuit resource set for the subinterval in response to the completing of the simulating of the operation of the system for the subinterval, and
    the dynamically updating and dynamically displaying the graph for each subinterval includes dynamically updating and dynamically displaying the graph to the user in response to completing the dynamically estimating of the respective circuit resource set for the subinterval.

17. The processor-implemented method of claim 6, wherein the outputting of the information includes displaying to a user a graph of the respective circuit resource sets and at least one limit versus the subintervals, each limit having a corresponding programmable integrated circuit and indicating a proportion of the programmable integrated circuit that is reconfigurable during each subinterval.

18. A program storage medium, comprising:
    a non-transitory processor-readable storage device storing instructions for analyzing an operation of a system reconfigurable to implement a plurality of optional hardware functions, wherein execution of the instructions by one or more processors causes the one or more processors to perform operations including:
       simulating the operation of the system during a time interval by executing a model of the system, wherein:
          the system is reconfigurable to implement a subset of the optional hardware functions,
          the model includes a query function and a plurality of parameters for including and excluding the optional hardware functions in the execution of the model of the system, and
          the query function queries the plurality of parameters;
       wherein the simulating includes determining the optional hardware functions that are active and which of the optional hardware functions are inactive during a plurality of subintervals of the time interval by tracking queries of the parameters by the query function during the subintervals;

wherein the execution of the model includes and excludes the optional hardware functions in response to the queries of the parameters during the subintervals;

estimating respective circuit resource sets for the subintervals of the time interval, wherein for each of the subintervals the respective circuit resource set implements the system including the optional hardware functions that are active during the subinterval; and storing information describing the respective circuit resource sets for the subintervals.

\* \* \* \* \*